United States Patent
Lee et al.

(10) Patent No.: US 9,307,349 B2
(45) Date of Patent: Apr. 5, 2016

(54) COMMUNICATION TERMINAL, PLACE MANAGEMENT SERVER, AND METHOD OF DETECTING PLACE INFORMATION THEREOF

(71) Applicant: Electronics and Telecommunications Research Institute, Daejeon (KR)

(72) Inventors: Seung-Ik Lee, Chungcheongbuk-do (KR); Inhak Joo, Daejeon (KR); RockWon Kim, Daejeon (KR); Yun Kyung Park, Daejeon (KR); Chae Kyu Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 191 days.

(21) Appl. No.: 14/021,861

(22) Filed: Sep. 9, 2013

(65) Prior Publication Data

US 2014/0213187 A1    Jul. 31, 2014

(30) Foreign Application Priority Data

Jan. 25, 2013 (KR) ........................ 10-2013-0008872

(51) Int. Cl.
*H04B 7/00* (2006.01)
*H04W 4/00* (2009.01)
*H04W 4/02* (2009.01)
*H04W 4/20* (2009.01)
*G01S 5/02* (2010.01)
*H04W 8/00* (2009.01)
*H04W 84/20* (2009.01)

(52) U.S. Cl.
CPC ................. *H04W 4/008* (2013.01); *G01S 5/02* (2013.01); *H04W 4/02* (2013.01); *H04W 4/20* (2013.01); *H04W 8/005* (2013.01); *H04W 84/20* (2013.01)

(58) Field of Classification Search
CPC ......... H04W 4/008; H04W 4/02; H04W 4/20; H04W 64/00
USPC ........................................................ 455/41.2
See application file for complete search history.

(56) References Cited

U.S. PATENT DOCUMENTS

| | | | | |
|---|---|---|---|---|
| 2009/0254975 A1* | 10/2009 | Turnbull | ............. | H04L 63/0492 726/3 |
| 2013/0204939 A1* | 8/2013 | Yajima | ................... | H04W 8/24 709/204 |
| 2015/0113384 A1* | 4/2015 | Tymoshenko | .... | G06F 17/30896 715/234 |

FOREIGN PATENT DOCUMENTS

| KR | 10-2000-0072447 A | 12/2000 |
|---|---|---|
| KR | 10-2002-0073537 A | 9/2002 |
| KR | 10-2011-0132642 A | 12/2011 |
| KR | 10-1092449 B1 | 12/2011 |
| WO | WO 01/58098 A2 | 8/2001 |

* cited by examiner

Primary Examiner — Ajibola Akinyemi

(57) ABSTRACT

A first Bluetooth terminal having a short range communication module that is set as an anchor searches for a peripheral Bluetooth terminal and transmits information of the found Bluetooth terminal to a place management server. The place management server updates place information of a user of the found Bluetooth terminal to place information of the first Bluetooth terminal and transmits the updated place information to the found Bluetooth terminal.

14 Claims, 6 Drawing Sheets

COMMUNICATION TERMINAL, PLACE MANAGEMENT SERVER, AND METHOD OF DETECTING PLACE INFORMATION THEREOF

CROSS-REFERENCE TO RELATED APPLICATION

This application claims priority to and the benefit of Korean Patent Application No. 10-2013-0008872 filed in the Korean Intellectual Property Office on Jan. 25, 2013, the entire contents of which are incorporated herein by reference.

BACKGROUND OF THE INVENTION (a) Field of the Invention

The present invention relates to a communication terminal, a place management server, and a method of detecting place information. More particularly, the present invention relates to a method of detecting location information about a user's location using a short range wireless communication terminal.

(b) Description of the Related Art

In a user's information, location information is one of central elements in providing a user custom-made service. Nowadays, due to the spread of smart phones, a user's location such as latitude and longitude can be easily determined using a global positioning system (GPS), and various location-based services are performed using the location information.

However, in an indoor environment, in most cases, because a GPS signal is not received, location information cannot be acquired using a GPS. Further, in an indoor environment in which a GPS signal is not received, location estimation may be performed using base station information of a mobile communication terminal or an access point (AP), but this has a problem that it provides more inaccurate information than a GPS.

Furthermore, it is not easy to grasp a positional meaning with only the user's location information that is generally displayed with latitude and longitude. For example, even if specific latitude and longitude are known, it is difficult to determine a place and to specify a place name and place classification. For example, when a large number of buildings exist at a periphery of specific coordinates, it is difficult to extract a specific location of a building with only simple coordinate information.

However, when a name and classification of a place at which the user is located can be determined, a service provider that provides a service using the name and the classification can perform marketing through more accurate targeting. For example, when a person frequently visits a hamburger shop (place classification) of "Lotteria" (place name), the person may use an intelligent and optimized custom-made service such as recommendation of a place of the same classification while traveling.

However, conventional location measurement technology uses only location information that is acquired from a GPS, an AP, and a mobile communication base station, and has a problem of an overly large error range indoors. Therefore, it is difficult to accurately determine the user's location with a conventional location measurement method, and it is very difficult to determine the user's place information using the location.

SUMMARY OF THE INVENTION

The present invention has been made in an effort to provide a communication terminal, a place management server, and a method of detecting place information having advantages of automatically detecting a user's place information.

An exemplary embodiment of the present invention provides a method of detecting a user's place information in a place information detection system. The method includes: searching for, by a first Bluetooth terminal having a short range communication module that is set as an anchor, a peripheral Bluetooth terminal; transmitting information of a Bluetooth terminal that is found by the first Bluetooth terminal to a place management server; and updating, by the place management server, place information of the user of the found Bluetooth terminal.

The method may further include transmitting, by the place management server, the updated place information to the found Bluetooth terminal.

The method may further include registering, by the first Bluetooth terminal, place information of the first Bluetooth terminal at the place management server. The updating of place information may include updating the location information of the user of the found Bluetooth terminal to the place information of the first Bluetooth terminal.

The method may further include receiving, by the first Bluetooth terminal, authentication of anchor authority from the place management server, before the searching for a peripheral Bluetooth terminal.

The method may further include setting the first Bluetooth terminal to the anchor according to an anchor function instruction from the user, before the searching for a peripheral Bluetooth terminal.

The place information may include a place name and place classification.

The updating of place information may include transmitting, by the place management server, peripheral place information to the found Bluetooth terminal based on the place information of the anchor; and updating, by the place management server, place information of a corresponding Bluetooth terminal to place information that is selected by the found Bluetooth terminal among the peripheral place information.

Another embodiment of the present invention provides a place management server that detects a user's place information. The place management server includes a communication unit, a member information database, and a member management unit. The communication unit communicates with a plurality of Bluetooth terminals having a short range communication module. The member information database stores place information to correspond to an identifier of the Bluetooth terminal. The member management unit updates place information that is stored to correspond to an identifier of a peripheral Bluetooth terminal that is found by the first Bluetooth terminal in which anchor authority is authenticated among the plurality of Bluetooth terminals at the member information database to place information of the first Bluetooth terminal.

The member management unit may authenticate anchor authority of the first Bluetooth terminal and store the place information of the first Bluetooth terminal at the member information database to correspond to an identifier of the first Bluetooth terminal.

The member management unit may extract and update the place information of the first Bluetooth terminal from the member information database.

The communication unit may transmit the updated place information to the found Bluetooth terminal.

The place management server may further include a place classification database and a place management unit. The place classification database may store place classification.

The place management unit may search for the place classification database and provide a place classification list of the place name to at least one Bluetooth terminal, when a place name is received from at least one Bluetooth terminal.

Yet another embodiment of the present invention provides a communication terminal that detects a user's place information. The communication terminal includes a Bluetooth search unit, an anchor setting unit, and a communication unit. The Bluetooth search unit searches for a peripheral Bluetooth terminal having a short range communication module. The anchor setting unit activates the Bluetooth search unit and registers the place information of the user terminal at a place management server. The communication unit transmits information of the found peripheral Bluetooth terminal to the place management server. Place information of a user of the peripheral Bluetooth terminal is updated to the place information of the user terminal by the place management server.

The communication terminal may further include a place database and a place setting unit. The place database may store the place information of the user terminal. The place setting unit may store the place information at the place database, when the place information of the user terminal is received from the place management server or the user.

DETAILED DESCRIPTION OF THE EMBODIMENTS

Figure 1:
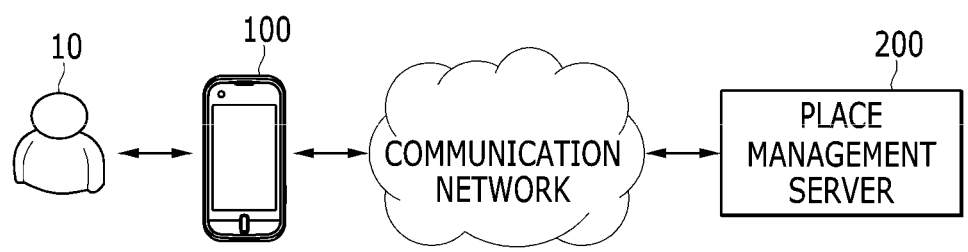
FIG. 1 is a diagram illustrating a place information detection system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

Hereinafter, a communication terminal, a place management server, and a method of detecting place information according to an exemplary embodiment of the present invention will be described in detail with reference to the drawings.

FIG. 1 is a diagram illustrating a place information detection system according to an exemplary embodiment of the present invention.

Referring to FIG. 1, the place information detection system includes a communication terminal 100 and a place management server 200.

The communication terminal 100 is connected to the place management server 200 through a communication network. The communication network may include an Internet communication network, wired and wireless communication networks, and a mobile communication network.

The communication terminal 100 is installed at a user 10 or a predetermined place, and includes a short range wireless communication module that can identify a corresponding communication terminal such as Bluetooth. For convenience of description, a short range wireless communication module that can identify a communication terminal is referred to as "Bluetooth", and the communication terminal 100 that includes a short range wireless communication module such as Bluetooth is referred to as "Bluetooth terminal".

The Bluetooth terminal 100 may search for a peripheral Bluetooth terminal and transmit an identifier of the found peripheral Bluetooth terminal to the place management server 200. A Bluetooth terminal having acquired authority that can search for a peripheral Bluetooth terminal is referred to as an anchor, and in order to acquire anchor authority, the anchor may or may not receive authentication from the place management server 200. That is, a Bluetooth terminal having received an anchor function instruction from the user without authentication from the place management server 200 may operate as an anchor. For example, the anchor may be a PC that is installed within a store or a mobile communication terminal of a store owner.

The Bluetooth terminal 100 receives place information about a location of the user 10 from the place management server 200. The place information may include a place name and place classification. The place name may be a place name such as Lotteria, and the place classification may represent a business type of the place name. The business type of the place name may be represented like an accommodation facility and a restaurant, the accommodation facility may be subdivided into, for example, a hotel, a condominium, and a motel, and the restaurant may be subdivided into, for example, a Korean restaurant, a Japanese restaurant, and a Chinese restaurant. The Bluetooth terminal 100 may receive direct input of place information from the user 10.

The place management server 200 registers place information of an anchor, updates place information of a corresponding user using an identifier of a Bluetooth terminal that receives from the anchor to place information of the anchor, and transmits the updated user's place information to the corresponding user's Bluetooth terminal.

The place management server 200 sets peripheral place information based on place information of the anchor as candidate place information and transmits the peripheral place information to the Bluetooth terminal 100, and when the place management server 200 receives a place name from the Bluetooth terminal 100, the place management server 200 searches for classification of the place name and transmits a place classification list to the Bluetooth terminal 100.

Figure 2:
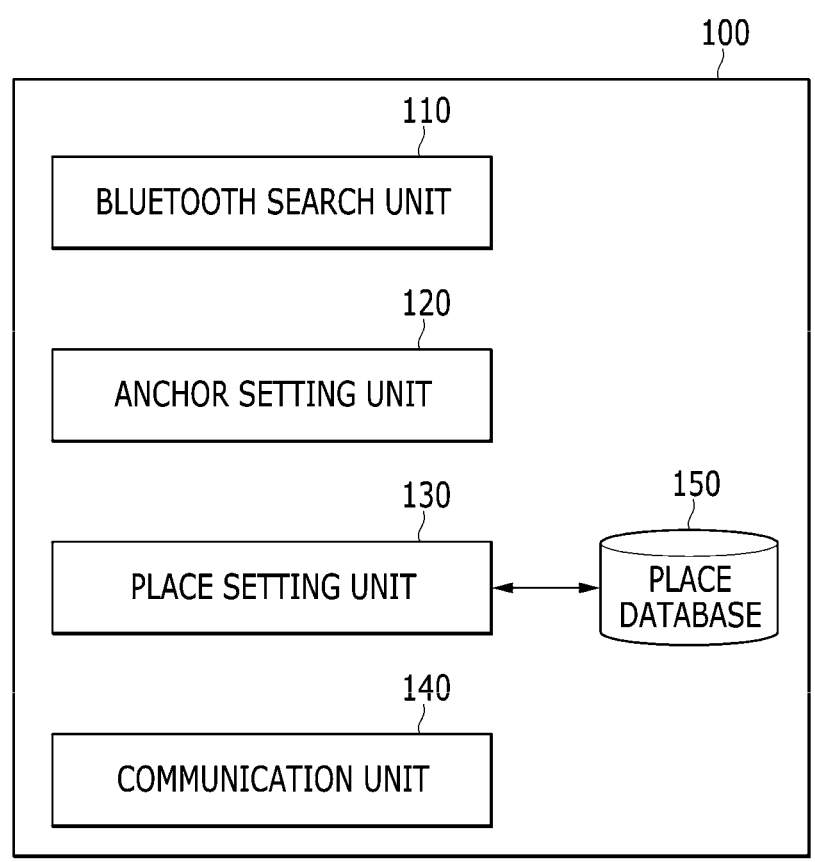
FIG. 2 is a block diagram illustrating a configuration of a Bluetooth terminal of FIG. 1.

FIG. 2 is a block diagram illustrating a configuration of the Bluetooth terminal of FIG. 1.

Referring to FIG. 2, the Bluetooth terminal 100 includes a Bluetooth search unit 110, an anchor setting unit 120, a place setting unit 130, a communication unit 140, and a place database 150.

The Bluetooth search unit 110 searches for a peripheral Bluetooth terminal and collects an identifier of the Bluetooth terminal.

The anchor setting unit 120 receives an input of an anchor function instruction from the user and requests authentication of anchor authority from the place management server 200, and when the anchor setting unit 120 receives authentication of anchor authority from the place management server 200, the anchor setting unit 120 sets the Bluetooth terminal 100 as an anchor and activates the Bluetooth search unit 110.

When the Bluetooth terminal 100 is set as an anchor, the anchor setting unit 120 transmits place information of the Bluetooth terminal 100 to the place management server 200 through the communication unit 140 and registers the place information at the place management server 200.

The place setting unit 130 stores the place information that it receives from the place management server 200 at the place database 150. The place setting unit 130 receives direct input of place information from the user and stores the place information at the place database 150. A method in which the user directly inputs place information may include a method of selecting one of peripheral place information that it receives from the place management server 200 and a method in which the user directly inputs a place name and selects place classification from a place classification list that it receives from the place management server 200.

The communication unit 140 supports communication with the place management server 200.

The place database 150 stores place information. The place information may include a place name and place classification.

At least some of the Bluetooth search unit 110, the anchor setting unit 120, the place setting unit 130, the communication unit 140, and the place database 150 of the Bluetooth terminal 100 may be embodied with hardware or with software, i.e., a program that is combined with hardware. Further, when at least some of the Bluetooth search unit 110, the anchor setting unit 120, the place setting unit 130, the communication unit 140, and the place database 150 are embodied with a program, a corresponding function may be performed by execution of the corresponding program.

Figure 3:
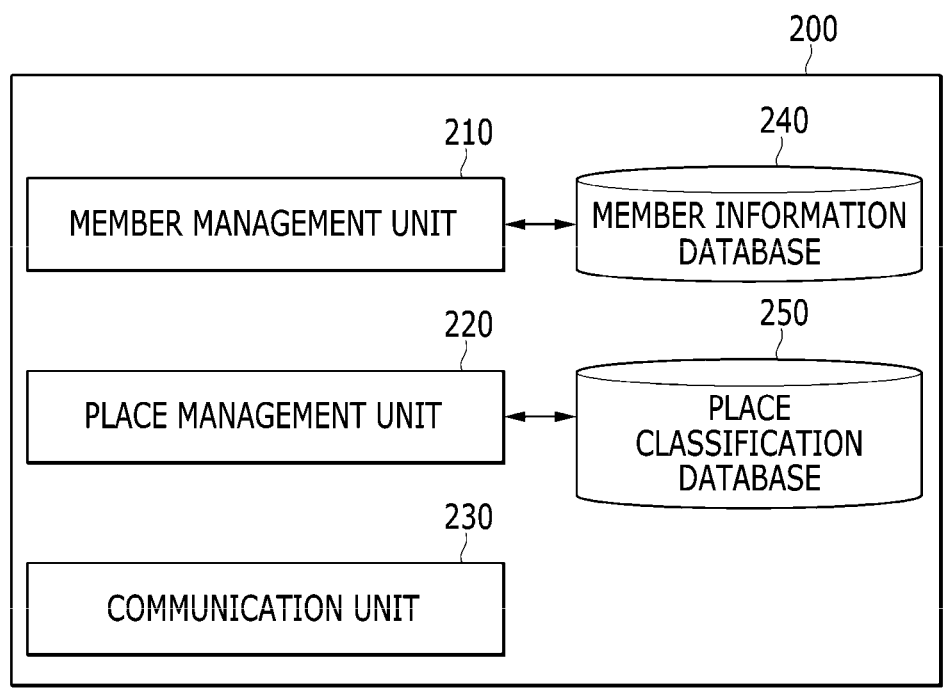
FIG. 3 is a block diagram illustrating a place management server of FIG. 1.

FIG. 3 is a block diagram illustrating a place management server of FIG. 1.

Referring to FIG. 3, the place management server 200 includes a member management unit 210, a place management unit 220, a communication unit 230, a member information database 240, and a place classification database 250.

The member management unit 210 performs member subscription and member authentication. The member management unit 210 manages member information.

The place management unit 220 extracts place information of a member using an identifier of a Bluetooth terminal, received from an anchor.

When the user directly inputs a place name to the Bluetooth terminal 100, the place management unit 220 searches for place classifications of a necessary place name at the place classification database 250, and transmits a found place classification list to the Bluetooth terminal 100 through the communication unit 230. Therefore, the Bluetooth terminal 100 selects one from the place classification list by user selection.

The place management unit 220 may set peripheral place information as candidate place information based on place information of the anchor, and transmit the place information to the Bluetooth terminal 100 through the communication unit 230.

The communication unit 230 supports communication with the Bluetooth terminal 100.

The member information database 240 stores member information. The member information may include identifier information, place name information, and place classification information of the Bluetooth terminal. That is, a place name and place classification to correspond to an identifier of the Bluetooth terminal are stored at the member information database 240.

The place classification database 250 stores classification information of a place.

At least some of the member management unit 210, the place management unit 220, the communication unit 230, the member information database 240, and the place classification database 250 of the place management server 200 may be embodied with hardware or with software, i.e., a program that is combined with hardware.

Figure 4:
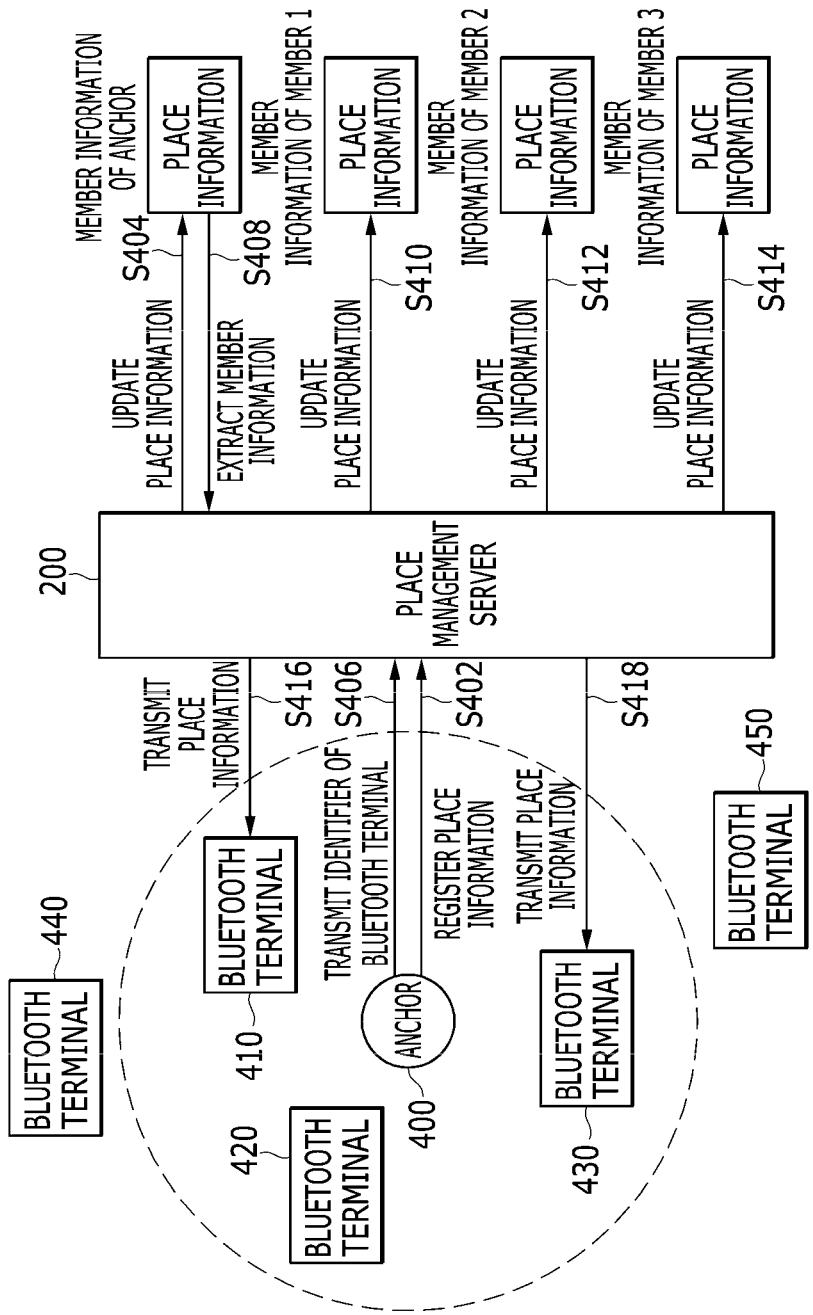
FIG. 4 is a flowchart illustrating a method of updating place information of a member in a place management server according to an exemplary embodiment of the present invention.

FIG. 4 is a flowchart illustrating a method of updating place information of a member in a place management server according to an exemplary embodiment of the present invention.

FIG. 4 illustrates six Bluetooth terminals 400, 410, 420, 430, 440, and 450 in order to describe a method in which the place management server 200 updates place information of a member, and it is assumed that the Bluetooth terminal 400 is an anchor. The Bluetooth terminals 410, 420, 430, 440, and 450 are terminals of a member 1, a member 2, a member 3, a member 4, and a member 5, respectively, and it is assumed that the Bluetooth terminals 400, 410, 420, 440, and 450 are in a state of being connected to the place management server 200 and the Bluetooth terminal 430 is in a state of not being connected to the place management server 200.

Referring to FIG. 4, the anchor 400 registers place information of the anchor 400 at the place management server 200 (S402). In this case, the place information of the anchor 400 may be input by a user of the anchor 400. For example, the anchor 400 may receive user input of both a place name and a place classification, or may first receive user input of only a place name and may receive a place classification list corresponding to the place name from the place management server 200 and receive an input of one place classification by user selection.

The place management server 200 updates place information of the anchor 400 (S404).

The anchor 400 searches for a peripheral Bluetooth terminal existing within a Bluetooth search area of the anchor 400. The anchor 400 transmits identifiers of the found Bluetooth terminals 410, 420, and 430 to the place management server 200 (S406).

The place management server 200 extracts place information from member information of the anchor 400 (S408).

The place management server 200 updates place information of a member having a Bluetooth identifier corresponding to the identifier of the Bluetooth terminal that it receives from the anchor 400 to place information of the anchor 400 with reference to the member information database 240 (S410, S412, and S414).

The place management server 200 transmits place information to the Bluetooth terminals 410 and 430 of a member while connecting to the place management server 200 among the updated members (S416 and S418).

The Bluetooth terminals 410 and 430 update place information of the Bluetooth terminals 410 and 430 with place information received from the place management server 200.

Figure 5:
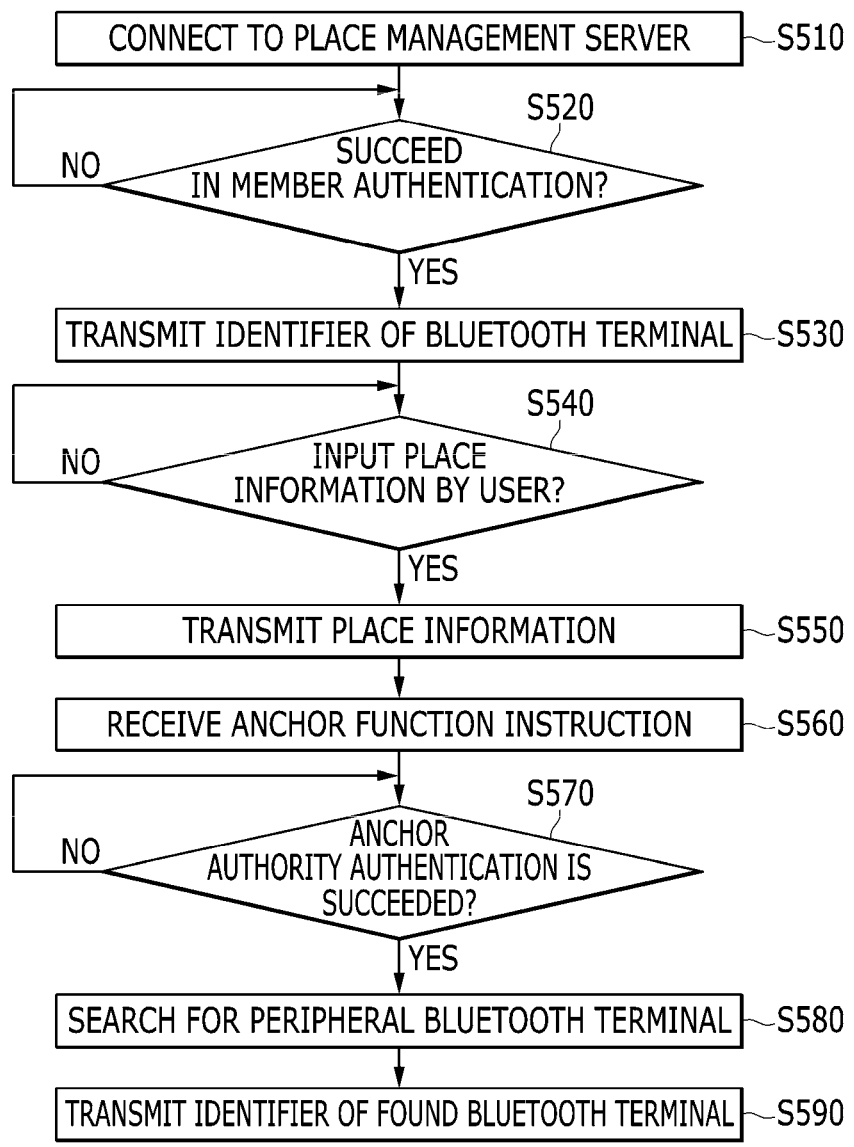
FIG. 5 is a flowchart illustrating operation of a Bluetooth terminal according to an exemplary embodiment of the present invention.

FIG. 5 is a flowchart illustrating operation of a Bluetooth terminal according to an exemplary embodiment of the present invention.

Referring to FIG. 5, the Bluetooth terminal 100 connects to the place management server 200 (S510).

The Bluetooth terminal 100 inputs membership subscription information and receives member authentication from the place management server 200.

If the Bluetooth terminal 100 succeeds in member authentication (S520), the Bluetooth terminal 100 transmits an identifier thereof to the place management server 200 (S530). In this case, the place management server 200 having received the identifier of the Bluetooth terminal 100 updates the identifier of the Bluetooth terminal 100 in member information of the member. Alternatively, when subscribing membership, the Bluetooth terminal 100 may transmit the identifier of the Bluetooth terminal 100 to the place management server 200.

After transmitting the identifier of the Bluetooth terminal 100, the Bluetooth terminal 100 determines whether place information is directly input by the user (S540). A direct input of place information may be selected by the user.

The Bluetooth terminal 100 transmits place information that is directly input by the user to the place management server 200 (S550), and the place management server 200 having received the place information updates place information in member information of the member. The place management server 200 stores the received place information to correspond to the identifier of the Bluetooth terminal 100.

Thereafter, the Bluetooth terminal 100 determines whether to perform an anchor function. Determination on whether to perform an anchor function may be selected by the user.

When the Bluetooth terminal 100 receives an anchor function instruction from the user (S560), the Bluetooth terminal 100 requests anchor authority authentication from the place management server 200 and receives authentication of anchor authority from the place management server 200.

The Bluetooth terminal 100 determines whether anchor authority authentication by the place management server 200 has succeeded (S570), and if anchor authority authentication by the place management server 200 has succeeded, the Bluetooth terminal 100 searches for a peripheral Bluetooth terminal (S580).

The Bluetooth terminal 100 transmits an identifier of the found Bluetooth terminal to the apparatus management server 200 (S590).

Figure 6:
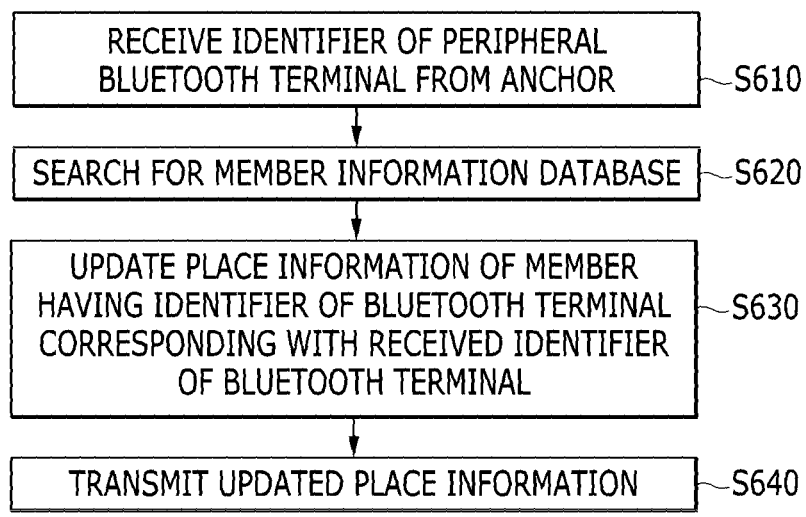
FIG. 6 is a flowchart illustrating a method of updating place information of a member in a place management server according to an exemplary embodiment of the present invention.

FIG. 6 is a flowchart illustrating a method of updating place information of a member in a place management server according to an exemplary embodiment of the present invention.

Referring to FIG. 6, the place management server 200 receives an identifier of a peripheral Bluetooth terminal from the anchor through the communication unit 230 (S610).

The member management unit 210 of the place management server 200 searches for a Bluetooth identifier corresponding to the identifier of the received Bluetooth terminal at the member information database 240 (S620).

The member management unit 210 updates place information of a member having the identifier of the Bluetooth terminal corresponding to the received identifier of the Bluetooth terminal at the member information database 240 (S630). In this case, the member management unit 210 extracts place information of the anchor from member information of the anchor, and updates place information of a member having the identifier of the Bluetooth terminal corresponding to the identifier of the received Bluetooth terminal to place information of the anchor.

When updating of the place information at the member information database 240 is complete, the place management server 200 transmits the place information to the Bluetooth terminal of the member in which place information is updated through the communication unit 230 (640). In this case, when the Bluetooth terminal of the member is not connected to the place management server 200 or when a corresponding program is not installed in the Bluetooth terminal of the member, even if place information is updated, the communication unit 230 may not transmit place information to the Bluetooth terminal of the member.

Much convenience and advantages when applying a place information detection system and method to real life according to an exemplary embodiment of the present invention will be described in detail.

First, a place information detection system and method according to an exemplary embodiment of the present invention may be applied to a service that provides custom-made advertisements. When a place information detection system and method according to an exemplary embodiment of the present invention are applied to custom-made advertisements, a custom-made advertisement service provider can know a place at which a user is presently located and classification of the place, and can thus provide optimal custom-made advertisements corresponding to classification of the present place. For example, when the user's present place is a large-sized mart, a present event product of the corresponding large-sized mart may be recommended to the user.

Further, a service may be provided using accumulative place information as well as present place information. For example, by analyzing the user's past place pattern, it can be seen that the user takes an interest in golf from place classification and a favorite golf course name of the user from a place name. When it is assumed that the user's favorite golf course is a public golf course, by providing event information and a booking service of the public golf course around a weekend, it is expected that the custom-made advertisement service provider can provide an optimal advertisement suitable to the user and maximize an effect of the advertisement.

According to an exemplary embodiment of the present invention, a place name and place classification of a place at which a user is located can be automatically extracted. Therefore, a case of manually receiving input from the user is remarkably reduced, and taste and preference about the user's place can be grasped and thus a better optimized place-based user custom-made service than an existing place-based service can be provided.

Further, because only a search function of a Bluetooth device is used, a paring process essential for information exchange between existing Bluetooth devices is unnecessary and thus place information can be extracted without the user's intervention.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of detecting place information in a place information detection system, the method comprising:

searching for, by a first Bluetooth terminal having a short range communication module that is set as an anchor, a peripheral Bluetooth terminal;

transmitting information of the peripheral Bluetooth terminal that is found by the first Bluetooth terminal to a place management server; and updating, by the place management server, place information of the peripheral Bluetooth terminal with place information of the first Bluetooth terminal, wherein the method further comprises registering, by the first Bluetooth terminal, the place information of the first Bluetooth terminal at the place management server, and wherein the registering of the place information comprises:
transmitting, by the first Bluetooth terminal, a place name to the place management server;
transmitting, by the place management server, a place classification list corresponding to the place name to the first Bluetooth terminal; and
selecting, by the first Bluetooth terminal, one from the place classification list.

2. The method of claim 1, further comprising transmitting, by the place management server, the updated place information to the peripheral Bluetooth terminal.

3. The method of claim 2, wherein the transmitting of the updated place information comprises transmitting the updated place information to only the peripheral Bluetooth terminal that is connected to the place management server among peripheral Bluetooth terminals found by the first Bluetooth terminal.

4. The method of claim 1, further comprising receiving, by the first Bluetooth terminal, authentication of anchor authority from the place management server, before the searching for the peripheral Bluetooth terminal.

5. The method of claim 1, further comprising setting the first Bluetooth terminal to the anchor according to an anchor function instruction from a user of the first Bluetooth terminal, before the searching for the peripheral Bluetooth terminal.

6. The method of claim 1, wherein the place information comprises a place name and place classification.

7. The method of claim 1, wherein the updating of the place information comprises:
transmitting, by the place management server, peripheral place information to the peripheral Bluetooth terminal, the peripheral place information being determined based on the place information of the anchor; and
updating, by the place management server, the place information of the peripheral Bluetooth terminal with place information that is selected by the peripheral Bluetooth terminal among the peripheral place information.

8. A place management server that detects place information, the place management server comprising:
a communication unit that communicates with a plurality of Bluetooth terminals having a short range communication module;
a member information database that stores place information corresponding to identifiers of the Bluetooth terminals; and
a member management unit that updates place information corresponding to an identifier of a peripheral Bluetooth terminal, which is stored in the member information database, with place information of a first Bluetooth terminal, the peripheral Bluetooth terminal being found by the first Bluetooth terminal in which anchor authority is authenticated among the plurality of Bluetooth terminals,
wherein the member management unit authenticates the anchor authority of the first Bluetooth terminal and stores the place information of the first Bluetooth terminal at the member information database to correspond to an identifier of the first Bluetooth terminal.

9. The place management server of claim 8, wherein the member management unit extracts and updates the place information of the peripheral Bluetooth terminal from the member information database.

10. The place management server of claim 8, wherein the communication unit transmits the updated place information to the peripheral Bluetooth terminal.

11. The place management server of claim 8, further comprising:
a place classification database that stores place classification; and
a place management unit that searches for the place classification database and provides a place classification list of a place name to at least one Bluetooth terminal, when the place name is received from the at least one Bluetooth terminal.

12. A communication terminal that detects place information, the communication terminal comprising:
a Bluetooth search unit that searches for a peripheral Bluetooth terminal having a short range communication module;
an anchor setting unit that activates the Bluetooth search unit and that registers place information of the communication terminal at a place management server; and
a communication unit that transmits information of the peripheral Bluetooth terminal to the place management server,
wherein place information of the peripheral Bluetooth terminal is updated with the place information of the communication terminal by the place management server, and
wherein the communication terminal further comprises:
a place database that stores the place information of the communication terminal; and
a place setting unit that stores the place information of the communication terminal at the place database, when the place information of the communication terminal is received from the place management server or a user of the communication terminal.

13. The communication terminal of claim 12, wherein the place information comprises a place name and place classification.

14. The communication terminal of claim 13, wherein the place classification comprises a business type of the place name.

* * * * *